US007445179B2

(12) United States Patent
Diochon et al.

(10) Patent No.: US 7,445,179 B2
(45) Date of Patent: Nov. 4, 2008

(54) ENGINE ASSEMBLY FOR AIRCRAFT

(75) Inventors: Lionel Diochon, Toulouse (FR); Frederic Journade, Toulouse (FR); Laurent LaFont, Pechbusque (FR); Mickael Sarrato, Madrid (ES); Alain Razafindrabe, Toulouse (FR)

(73) Assignee: Airbus France, Toulouse (FR)

( * ) Notice: Subject to any disclaimer, the term of this patent is extended or adjusted under 35 U.S.C. 154(b) by 218 days.

(21) Appl. No.: 11/527,622

(22) Filed: Sep. 27, 2006

(65) Prior Publication Data

US 2007/0069069 A1 Mar. 29, 2007

(30) Foreign Application Priority Data

Sep. 28, 2005 (FR) .................................. 05 52933

(51) Int. Cl.
*B64D 29/00* (2006.01)

(52) U.S. Cl. ........................................ 244/54; 248/554

(58) Field of Classification Search .................. 244/55, 244/54; 248/555, 554

See application file for complete search history.

(56) References Cited

U.S. PATENT DOCUMENTS

2007/0069069 A1 3/2007 Diochon et al.

FOREIGN PATENT DOCUMENTS

| | | | |
|---|---|---|---|
| EP | 0 147 878 | A1 | 7/1985 |
| FR | 2 676 707 | A1 | 11/1992 |
| GB | 2 010 969 | A | 7/1979 |

OTHER PUBLICATIONS

U.S. Appl. No. 12/067,192, filed Mar. 18, 2008, Lafont, et al.
U.S. Appl. No. 12/066,916, filed Mar. 14, 2008, Lafont.

*Primary Examiner*—Timothy D Collins
(74) *Attorney, Agent, or Firm*—Oblon, Spivak, McClelland, Maier & Neustadt, P.C.

(57) ABSTRACT

The invention relates to an engine suspension pylon for an aircraft including a rigid structure provided with a box (24), this pylon also including an engine aft attachment (8) provided with an attachment body (38), and a thrust resistance device (9) generated by the engine. The rigid structure according to the invention includes an offset rib (35) for the attachment body (38), this rib (35) being mounted fixed on the box (24) between the box and the engine (2) and carrying the attachment body. Furthermore, the device (9) includes a thrust resistance spar (**9*b*) of which the forward end is mounted fixed on the rib (35**), and the aft end is mounted fixed on the box.

7 Claims, 3 Drawing Sheets

ENGINE ASSEMBLY FOR AIRCRAFT

TECHNICAL DOMAIN

This invention relates to an assembly for an aircraft in general, including a suspension pylon for an engine such as a turbojet. This type of suspension pylon, also called <<EMS>> (Engine Mounting Structure), is used for example for suspension of the turbojet below the aircraft wing, through a mounting system including a plurality of engine attachments.

STATE OF PRIOR ART

Such a suspension pylon is designed to form the connecting interface between an engine such as a turbojet and a wing of the aircraft. It transmits forces generated by its associated turbojet to the structure of this aircraft and is also used for routing fuel, electrical, hydraulic and air systems between the engine and the aircraft.

In order to transmit forces, the pylon includes a rigid structure, frequently of the <<box>> type, in other words formed by the assembly of the upper and the lower spar with two side panels connected to each other through transverse ribs.

Furthermore, the pylon is provided with an assembly system inserted between the turbojet and the rigid structure of the pylon, this system including globally at least two engine attachments, globally one forward attachment and one aft attachment.

Moreover, the assembly system includes a device for resisting thrust forces generated by the turbojet. For example in prior art, this device may be in the form of two lateral connecting rods connected firstly to an aft part of the turbojet fan case, and secondly to the engine aft attachment fixed to the engine case.

Similarly, the suspension pylon also includes a second mounting system inserted between the rigid structure of this pylon and the aircraft wing, this second system typically being composed of two or three attachments.

Finally, the pylon is provided with a secondary structure for segregation and for holding systems in place, while supporting aerodynamic fairings.

As mentioned above, a conventional suspension pylon according to prior art is provided with an aft attachment fixed directly onto the lower spar of the box, through its aft attachment body.

This configuration has various disadvantages, including the disadvantage related to the fact that the box forming the rigid structure of the pylon is very close to the engine suspended from the pylon, which naturally introduces thermal constraints that restrict the choice of materials for the above-mentioned box.

Furthermore, the fact that the engine aft attachment is connected directly onto the lower spar implies that the box needs to be brought as close as possible to the engine case, so that this engine aft attachment for which the vertical dimension must be limited can be put into place. However, this configuration is such that the lower part of the box forms a large obstacle in the fan flow area, and therefore causes severe aerodynamic disturbances due to the large width of the box sized essentially as a function of the wing interface that it supports.

Furthermore, the fact that the box needs to be brought as close as possible to the engine case normally requires a change to the geometry of this box, which can then no longer remain plane on its lower face. This necessarily introduces manufacturing constraints due to the increased complexity of the design of the lower part of the box, and oversizing that increases the global mass of the entire suspension pylon.

OBJECT OF THE INVENTION

Therefore, the purpose of this invention is to disclose an aircraft engine assembly that at least partially corrects the disadvantage mentioned above related to embodiments according to prior art.

The invention achieves this in that its object is an aircraft engine assembly including an engine and an engine suspension pylon, the pylon including a rigid structure provided with a box formed by the assembly of an upper spar and a lower spar and two side panels connected to each other through transverse ribs, the pylon also including a mounting system inserted between the engine and the rigid structure, this mounting system particularly including an engine aft attachment provided with an attachment body, and a device for resistance of thrust forces generated by the engine, this thrust resistance device including a cross beam and two lateral thrust resistance rods, one aft end of which is articulated onto the cross beam that is connected onto the attachment body of the engine aft attachment. According to the invention, the rigid structure also includes a rib that offsets the attachment body of the engine aft attachment, the offset rib being mounted fixed on the box between the box and the engine and carrying the attachment body. Furthermore, the thrust resistance device includes a thrust resistance spar of which the forward end is mounted fixed on said offset rib and the aft end is mounted fixed on the box.

Thus, in this non-limitative case in which the engine is designed to be suspended under the aircraft wing, the proposed invention makes it globally possible to offset the engine aft attachment downwards from the box, by means of the offset rib that therefore forms an integral part of the rigid structure.

The addition of this rib not used in products according to prior art in which the rigid structure was composed exclusively of the box, has many advantages including that the engine suspended from the pylon can be moved further away from this box. Consequently, the temperature conditions applied to the box are less severe than the conditions found in prior embodiments in which the attachment interface of the engine aft attachment was directly located on the lower spar. Therefore this improvement in temperature conditions makes it possible to consider the use of materials less sensitive to heat for manufacturing of the rigid box, such as composite materials of the type including resin-impregnated glass fiber and/or carbon fiber. In this case, there can advantageously be a very large mass saving for the suspension pylon assembly.

Note also that the proposed invention provides a means of dissociating the rib design dictated essentially by the need to transfer forces from the engine aft attachment, from the design of the box, sized principally as a function of the wing interface that it supports. This special feature implies that the width of the rib can be less than the width of the box, thus providing an advantage in terms of aerodynamic performances, considering that the narrow rib rather than the lower part of the wider box is located in the fan flow area. Aerodynamic disturbances at the engine aft attachment are thus lower than disturbances that occurred previously. Nevertheless, note that the box and the offset rib could have the same width, without going outside the scope of this invention.

Furthermore, obviously it should be understood that the geometry of the box is no longer influenced by the need to move closer to the engine case, because this function can be provided entirely by the added rib fixed on this box. Consequently, the geometry and manufacturing of this box may be considerably simplified, particularly by providing a plane lower face of the box from one end of the rigid structure to the other. Its mass is then reduced and is perfectly optimized, because advantageously the lower part of the box no longer has a wide setback solely designed to bring it closer towards the engine case.

Note that the rib projecting from the box in the downward direction makes it easy to consider passing pipes or similar elements through it. Therefore this option available to pylon equipment such as a heat exchanger system facilitates access to the aft part of the rigid structure which in prior art required a passage through the box, for which access is relatively difficult.

Furthermore, the addition of the thrust resistance spar provides a simple and innovative solution for routing thrusts as far as the box of the rigid structure, these forces preferably being transmitted to this resistance spar through a system of conventional lateral connecting rods known to those skilled in the art. With such a thrust resistance spar, the size of the offset rib may be limited, to the extent that it is intended essentially to resist forces from the engine aft attachment, rather than forces dependent on the engine thrust that therefore pass through the resistance spar provided for this purpose.

Preferably, by putting side plates into place on the assembly composed of the offset rib and the force resistance spar, an assembly is obtained in the form of a secondary rigid box, comparable to a stem or a shoe.

Preferably, the thrust resistance device also includes a cross beam and two lateral connecting rods for thrust resistance, in which the aft end is articulated on the cross beam, the cross beam being connected onto the attachment body of the engine aft attachment. Therefore, this is a conventional solution designed to resist engine thrust forces in conjunction with the resistance spar, as described above.

Preferably, the resistance spar is arranged to move closer to the box moving in the aft direction, in the same way as for the lateral force resistance connecting rods. A projection is formed in a plane defined by the longitudinal and vertical direction of the pylon, in which the angle formed between a direction of the force resistance connecting rods and a direction of the force resistance spar is between −15 and +15 degrees. This arrangement, by which alignment of the projection of the connecting rods and the spar can be optimized, assures continuity in the resistance of thrusts, thus making this resistance very satisfactory.

As mentioned above, the box is preferably made from a composite material of the type including resin-impregnated glass fibers and/or carbon fibers, which introduces a considerable global mass saving. Therefore, moving this box away from the hot part of the engine enables the use of such a type of material. On the other hand, the offset rib can be metallic, for example made of titanium, so that it can resist the thermal stresses generated by the proximity of the engine. Nevertheless, it would also be possible for the rib to be made of a composite material or any other material without going outside the scope of the invention. In such a case, the material used would be less sensitive to heat that the material used to make the box.

Due to the presence of the rib used to bring the rigid structure towards the engine case, and preferably the exhaust casing, the proposed invention makes it possible to envisage the use of a plane lower spar type of lower structural element, that considerably simplifies manufacturing of the box, while advantageously reducing its global mass. Obviously, this lower structural element carries the offset rib.

The offset rib is preferably mounted on the box through a plurality of tension bolts and shear pins, to reduce thermal conduction between the offset rib and the rigid box, which is an objective principally when the box is made of a composite material. This can be done by optionally inserting insulating elements such as rings, washers or an insert layer between these two elements of the rigid structure of the suspension pylon.

Finally, another purpose of the invention is an aircraft with at least one such engine assembly.

Other advantages and characteristics of the invention will become clearer from the detailed non-limitative description given below.

BRIEF DESCRIPTION OF THE DRAWINGS

This description will be made with reference to the appended drawings wherein.

DETAILED DESCRIPTION OF PREFERRED EMBODIMENTS

Figure 1:
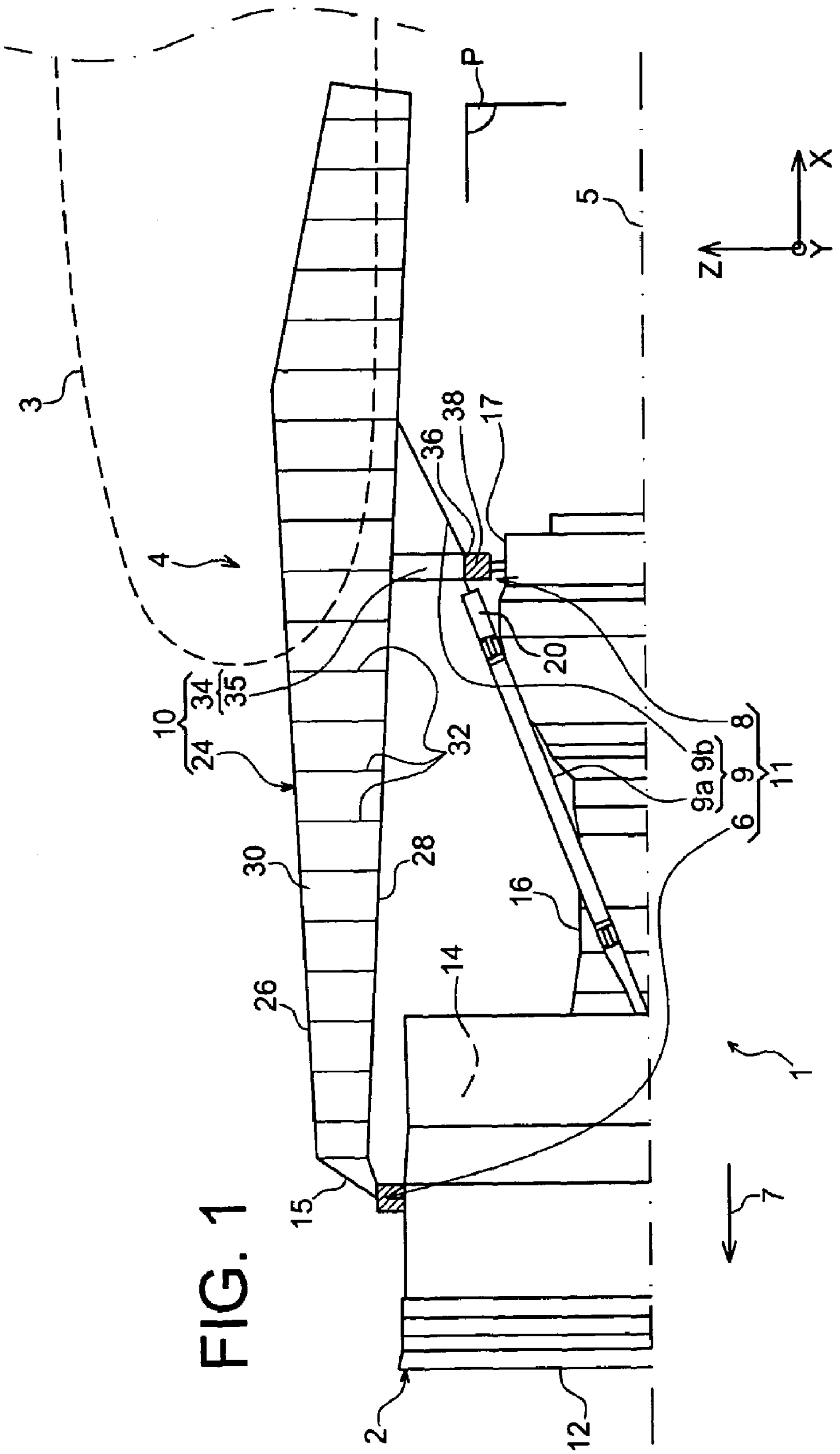
FIG. 1 shows a side view of an engine assembly for an aircraft according to one preferred embodiment of this invention.

With reference to FIG. 1, the figure shows an engine assembly 1 for an aircraft designed to be fixed under a wing 3 of this aircraft, this assembly 1 according to this invention being provided with a suspension pylon 4 in the form of a preferred embodiment of this invention.

Globally, the engine assembly 1 includes an engine such as a turbojet 2 and the suspension pylon 4, the suspension pylon having in particular a rigid structure 10 and a mounting system 11 composed of a plurality of engine attachments 6, 8 and a device 9 for resistance of thrusts generated by the turbojet 2, the mounting system 11 therefore being inserted between the engine and the rigid structure 10 mentioned above. For information, note that the assembly 1 is designed to be surrounded by a pod (not shown), and that the suspension pylon 4 includes another set of attachments (not shown) for suspension of this assembly 1 under the aircraft wing.

Throughout the following description, by convention the X direction is the longitudinal direction of the pylon 4 that is coincident with the longitudinal direction of the turbojet 2, this direction X being parallel to a longitudinal axis 5 of this turbojet 2. Furthermore, the direction transverse to the pylon 4 is called Y and can be considered to be the same as the transverse direction of the turbojet 2, and Z is the vertical direction or the height, these three X, Y and Z directions being orthogonal to each other.

Furthermore, the terms <<forward>> and <<aft>> should be considered with respect to a direction of movement of the aircraft that occurs as a result of the thrust applied by the turbojet 2, this direction being shown diagrammatically by the arrow 7.

Only the force resistance device 9, the engine attachments 6, 8 and the rigid structure 10 of the suspension pylon 4 are shown in FIG. 1. The other components of this pylon 4 not shown, such as the means of fastening the rigid structure 10 under the aircraft wing, or the secondary structure for segregation of systems and holding them in place while also supporting aerodynamic fairing, are conventional elements identical to or similar to those encountered in prior art and known to those skilled in the art. Consequently, no detailed description of them will be given.

The turbojet 2 is provided with a large dimension fan case 12 at the forward end delimiting an annular fan duct 14 and includes a smaller central case 16 towards the aft end, containing the core of this turbojet. Finally, the central case 16 is extended backwards by an exhaust case 17 larger than the case 16. Obviously, the cases 12, 16 and 17 are all fixed to each other.

As can be seen in FIG. 1, the plurality of engine attachments consists of an engine forward attachment 6 and an engine aft attachment 8, possibly forming two half aft attachments as known in prior art. The force resistance device 9 includes in particular two lateral thrust resistance connecting rods 9*a* (only one being shown in FIG. 1 because it is a side view) connected firstly to a forward part of the central casing 16 through their forward end, and secondly to a cross beam 20 through their aft end, this cross beam itself being mounted on the rigid structure 10 as will be described in detail below.

The engine forward attachment 6, fixed to the fitting 15 of the rigid structure 10 and to the fan case 12, is designed conventionally so that it resists only the forces generated by the turbojet 2 along the Y and Z directions, and therefore not the forces applied along the X direction. For information, this forward attachment 6 preferably penetrates into a circumferential end portion of the fan case 12.

The engine aft attachment 8 is globally inserted between the exhaust case 17 and the rigid structure 10 of the pylon. As described above, it is preferably designed so as to be able to resist forces generated by the turbojet 2 along the Y and Z directions, but not forces applied along the X direction.

In this way, with the statically determinate assembly system 11, forces applied along the X direction are resisted by the device 9, and forces applied along the Y and Z directions are resisted jointly by the forward attachment 6 and the aft attachment 8.

Furthermore, the moment applied about the X direction is resisted vertically by means of the attachment 8, the moment applied about the Y direction is resisted vertically by means of the aft attachment 8 cooperating with the attachment 6, and the moment applied about the Z direction is resisted transversely by means of the aft attachment 8 cooperating with the attachment 6.

Also with reference to FIG. 1, it can be seen that one of the special features of the invention lies in the innovative design of the rigid structure 10 of the suspension pylon. The structure 10 includes firstly a box 24 extending from one end of this structure 10 to the other along the X direction, and therefore forms a torsion box called the main box of the structure. Conventionally, it includes an upper spar 26 and a lower spar 28, and two side panels 30 (only one being shown in FIG. 1) both extending along the X direction and substantially in an XZ plane. Transverse ribs 32 arranged in YZ planes at a spacing along the longitudinal direction inside this box increase the stiffness of the box 24. For information, note that each of the elements 26, 28 and 30 can be made in a single piece, or by the assembly of adjacent sections that can possibly be slightly inclined with respect to each other.

Preferably, as clearly shown in FIG. 1, the lower spar 28 is plane over its entire length, this plane being substantially parallel to an XY plane or slightly inclined with respect to this plane.

If the engine is designed to be suspended under the wing, it is preferable to mount a fixed structural block 34 called the lower structural block 34 due to its position under the box 24 on the outer surface of the lower spar 28, this block preferably being in the form of a rigid secondary box comparable to a stem or a shoe. Nevertheless, note that in a case not described but covered by this invention in which the engine 2 is mounted above the wing 3, the structural block would then be fixed onto the upper spar 26 of the box.

The block 34 has an offset rib 35 substantially oriented in an YZ plane, and is preferably located along the extension of a transverse rib 32 of the box 24, under the box. The rib 35 that closes the forward part of the block 34 is used essentially to offset an attachment body 38 of the aft attachment 8 under the box 24. It has an attachment interface 36 for attachment of the aft attachment 8, this interface 36 therefore being located underneath the plane in which the spar 28 is located, and preferably oriented along an XY plane. As will be described later, note that this attachment interface 36 is designed to cooperate with the attachment body 38 of the engine aft attachment 8.

Consequently this solution in which the width of the block 34 along the Y direction may be greater than the width of the box 24, makes it possible to offset the attachment 8 downwards from the box 24, and therefore to move the engine 2 away from the box.

Thermal stresses applied to the box 24 are thus relatively low, such that it becomes possible to make the box from a composite material of the type including resin-impregnated glass fibers and/or carbon fibers, or from any other material sensitive to heat that could enable a saving in terms of the global mass of the pylon 4. On the other hand, the block 34 and more particularly its offset rib 35, is more exposed to thermal stresses due to its proximity to the engine 2. Consequently, it is preferably made from a metallic material, such as titanium.

The force resistance device 9 also includes a thrust resistance spar 9*b* that forms an integral part of the block 34, namely its lower part. It is also preferably made from a metallic material such as titanium.

Figure 2:
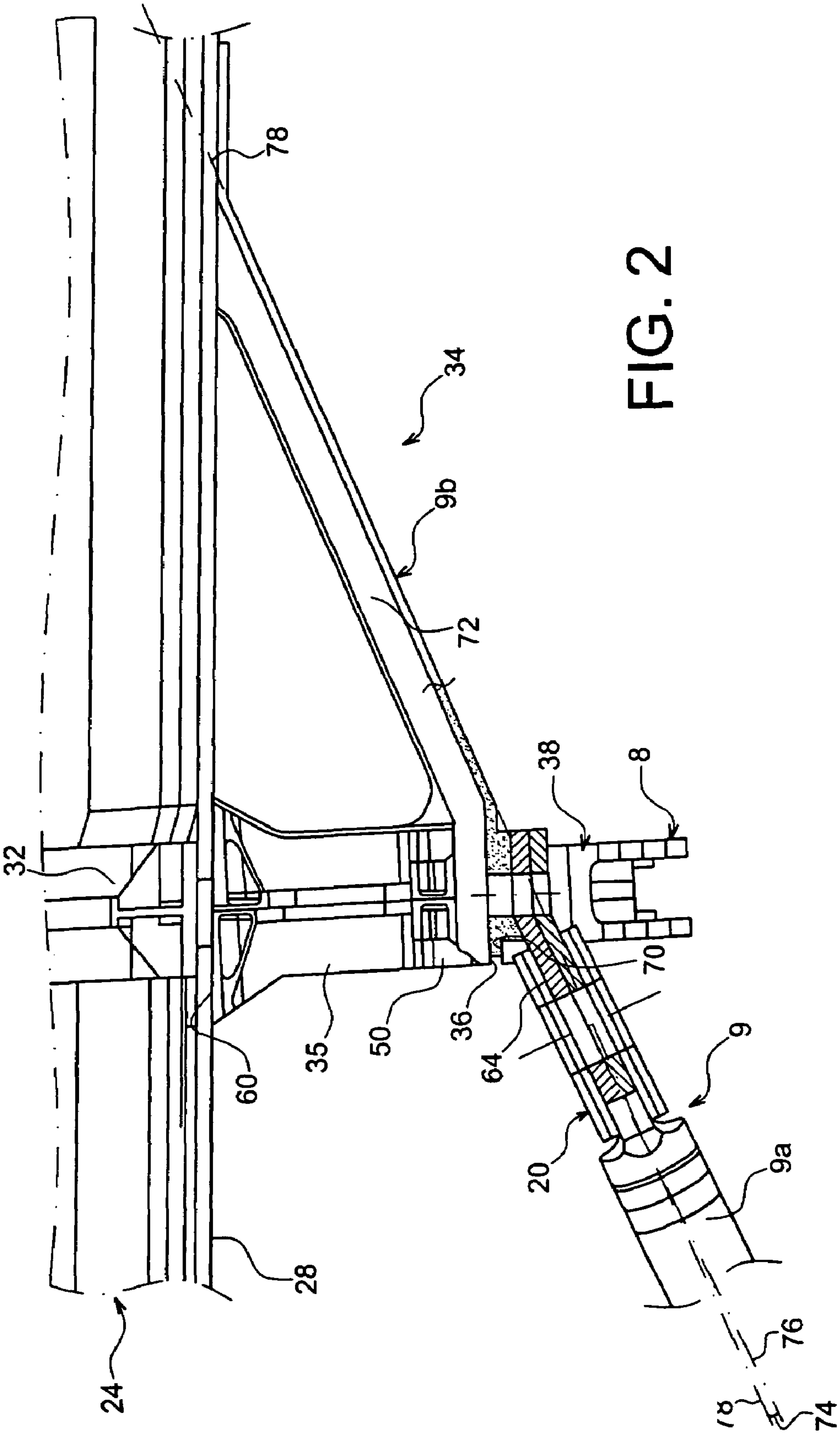
FIG. 2 shows a detailed partial side view of the suspension pylon of the engine assembly shown in FIG. 1.
Figure 3:
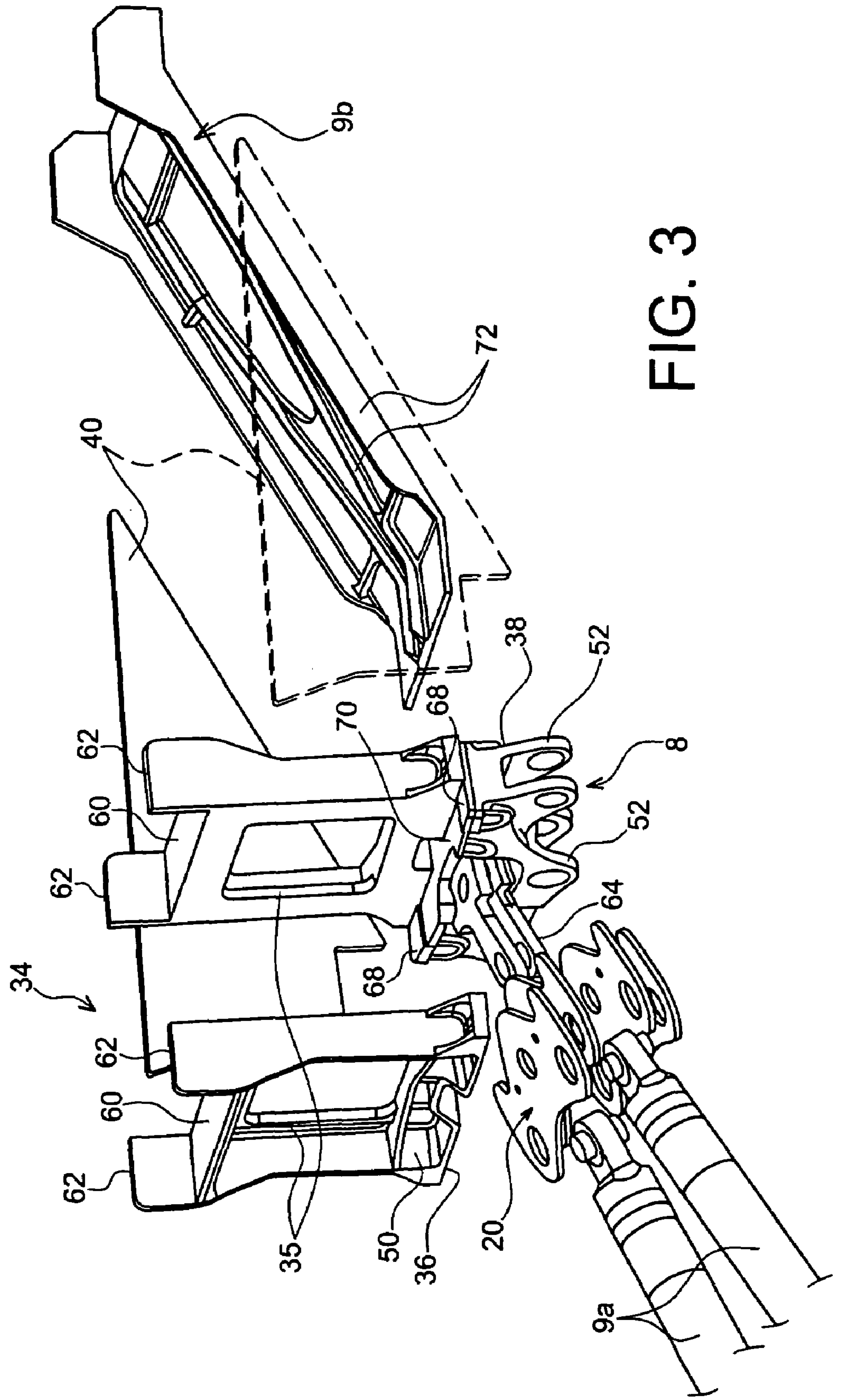
FIG. 3 shows an exploded perspective view of the part of the suspension pylon shown in FIG. 2.

Now with reference to FIGS. 2 and 3, it can be seen that the structural block 34 fixed under the lower spar 28 has not only an offset rib 35, the resistance spar 9*b*, but also two side plates 40 oriented in XZ planes and closing the sides of the secondary rigid box. Nevertheless, note that although the side plates 40 mentioned above are preferably structural, they could alternately be used to form airtight fairings only.

The upper part of the rib 35, that is preferably double as shown, in other words is composed of two superposed ribs along the X direction, is provided with an interface in the upper part for fixing it to the main box, this interface being composed of a main surface 60 located in an XY plane and designed to contact the lower spar 28 of the box 24, and secondary surfaces 62 provided on upper ribs located in XZ planes and designed to come into contact with the side panels of the box.

In this respect, note that the rib 35 is preferably fixed to the box 24 through a plurality of shear pins (not shown). These fixing means can advantageously reduce thermal conduction between the rib 35 and the lower spar 28, this conduction possibly being reduced even further by inserting insulating rings or washers between these two elements 24, 35.

The attachment interface 36 is defined by a lower portion 50 of the offset rib 35, preferably in the form of a frame. Thus, this attachment interface 36 globally forms a horizontal strip extending along the Y direction onto which the attachment body 38 of the engine aft attachment 8 is fixed, preferably through bolts.

This attachment body 38 is of the known type and its design is substantially the same as that used earlier in embodiments in which this body was mounted directly onto the lower spar

28 of the box. Thus, the attachment body includes devises 52 on which shackles (not shown) are hinged, that will also be hinged on fittings fixed to the engine.

Furthermore, the attachment body 38 includes a housing that will be fitted with a mechanical link 64 making the junction between this body 38 and the cross beam 20. The link 64 is then preferably in the form of a tongue-shaped fitting, preferably double as shown, in which the aft end is fixed onto the body 38 through a vertical pivot and at least one shear pin (not shown) passing through these two elements. Secondly, the forward end of the fitting 64 is mounted free to pivot on the cross beam 20 through a pivot (not shown) inclined in an XZ plane and passing through these two elements, this same cross beam 20 being hinged at its two ends with the two thrust resistance connecting rods 9*a*.

The thrust resistance spar 9*b* that is preferably double is arranged to bring it closer to the box 24 by moving it along the aft direction. Consequently, the block 34 is then in the form of an substantially triangular longitudinal section, as can be seen best in FIG. 2. Its aft end is added on fixed to the box 24, preferably onto the side panels 30 and possibly also onto the lower spar 28. Its forward end is added fixed onto the lower portion 50 of the rib 35, between the rib and the attachment body 38 of the attachment 8. More precisely, it would be possible for the forward end of this fitting 64 to be located firstly in contact with the interface 36 of the rib 35 also used to contact the attachment interface 68 of the body 38, and secondly in contact with this body. To achieve this, the attachment interface 36 may be plane, and the upper part of the attachment body 38 may have an indent 70 in which the spar 9*b* can be housed, the attachment interface 68 then being located on each side of the indent 70 along the Y direction, as is clearly shown in FIG. 3.

Furthermore, it would be possible for the lower part of the forward end of the spar 35 to be in contact not only with the attachment body 38, but also with the aft end of the fitting 64. In this way, the vertical pivot (not shown) passing through these latter two elements 38, 64 preferably also passes through the forward end of the resistance spar 9*b*.

Note that although the attachment interface between the spar 9*b* and the rib 35 is preferably horizontal as has just been described, it could also be vertical, namely arranged in an XY plane, without going outside the scope of the invention.

With reference more specifically to FIG. 2, it can be seen that the resistance spar 9*b* with reinforcing ribs 72 is arranged substantially aligned with the resistance rods 9*a* and towards the aft direction from these rods, when the pylon is looked at in projection on a vertical plane XZ.

More precisely, it would be possible for the angle 74 formed on this projection between a direction 76 of the connecting rods 9*a* and a direction 78 of the spar 9*b* to be between −15 and +15 degrees, which optimizes the resistance to thrust forces.

Obviously, those skilled in the art could make various modifications to the assembly 1 and to the aircraft suspension pylon 4 that have just been described, solely as non-limitative examples. For example in particular, it is worth mentioning that although the pylon 4 has been presented in a configuration suitable for suspension under the aircraft wing, this pylon 4 could also be presented in a different configuration so that it could be mounted above this wing, or even in the aft part of the aircraft fuselage.

The invention claimed is:

1. Engine assembly for an aircraft including an engine (2) and a suspension pylon (4) for the engine (2), said pylon including a rigid structure, (10) provided with a box (24) formed by the assembly of an upper spar and a lower spar (26, 28) and two side panels (30) connected to each other through transverse ribs (32), said pylon also including a mounting system (11) inserted between the engine and said rigid structure (10), this mounting system particularly including an engine aft attachment (8) provided with an attachment body (38), and a device for resistance of thrust forces (9) generated by the engine, said thrust resistance device (9) including a cross beam (20) and two lateral thrust resistance rods (9*a*) one aft end of which is articulated onto said cross beam (20), that is connected onto said attachment body (38) of the engine aft attachment (8), characterized in that said rigid structure (10) also includes an offset rib (35) for said attachment body (38) of the engine aft attachment, said offset rib (35) being mounted fixed on said box (24) between the box and the engine (2) and carrying said attachment body (38), and in that said thrust resistance device (9) also includes a thrust resistance spar (9*b*) of which the forward end is mounted fixed on said offset rib (35), and the aft end is mounted fixed on said box (24).

2. Assembly according to claim 1, characterized in that said resistance spar (9*b*) is arranged to move closer to said box (20) moving in the aft direction.

3. Assembly according to claim 2, characterized in that a projection is formed in a plane defined by the longitudinal (X) and vertical direction (Z) of the pylon, in which the angle (74) formed between a direction (76) of the force resistance connecting rods (9*a*) and a direction (78) of the force resistance spar (9*b*) is between −15 and +15 degrees.

4. Assembly according to any one of the previous claims, characterized in that said box (24) is made from a composite material.

5. Assembly according to claim 1, characterized in that said offset rib (35) is metallic.

6. Assembly according to claim 1, characterized in that a lower structural element (28) forming part of said box (24) carries said offset rib (35).

7. Aircraft characterized in that it includes at least one engine assembly (1) according to claim 1.

* * * * *